US009065694B2

(12) United States Patent
Siti et al.

(10) Patent No.: US 9,065,694 B2
(45) Date of Patent: Jun. 23, 2015

(54) METHOD AND DEVICE FOR CHANNEL ESTIMATION, AND CORRESPONDING COMPUTER PROGRAM PRODUCT

(75) Inventors: Massimiliano Siti, Peschiera Borromeo (IT); Antonio Assalini, Padua (IT); Silvano Pupolin, Venice (IT)

(73) Assignee: STMicroelectronics S.r.l., Agrate Brianze (IT)

( * ) Notice: Subject to any disclaimer, the term of this patent is extended or adjusted under 35 U.S.C. 154(b) by 505 days.

(21) Appl. No.: 12/913,589

(22) Filed: Oct. 27, 2010

(65) Prior Publication Data

US 2011/0096816 A1    Apr. 28, 2011

(30) Foreign Application Priority Data

Oct. 28, 2009  (IT) .............................. TO2009A0832

(51) Int. Cl.
*H04K 1/10*       (2006.01)
*H04L 27/28*      (2006.01)
(Continued)

(52) U.S. Cl.
CPC ......... *H04L 25/0204* (2013.01); *H04L 25/0228* (2013.01); *H04L 25/024* (2013.01); *H04L 27/2649* (2013.01)

(58) Field of Classification Search
USPC .......................... 375/341, 346, 295, 260, 211
See application file for complete search history.

(56) References Cited

U.S. PATENT DOCUMENTS 5,758,261 A * 5/1998 Wiedeman .................... 455/13.1
6,341,213 B1 * 1/2002 Wu .............................. 455/12.1
(Continued)

OTHER PUBLICATIONS

Park et al., Iterative Receiver with Joint Dectection and Channel Estimation for OFDM System with Multiple Receiver antennal in Mobile radio Channels, 2001, IEEE.*
(Continued)

*Primary Examiner* — Chieh M Fan
*Assistant Examiner* — Wednel Cadeau
(74) *Attorney, Agent, or Firm* — Seed IP Law Group PLLC (57) ABSTRACT

An embodiment of the time-variant channel estimation in an OFDM transmission system envisages the operations of: a) determining the received signal vector $Y_{j,k}$ for one or more of R receiving antennas, j=1, . . . , R, and at the current time instant k together with the frequency-domain channel-estimate vector $\hat{H}_{j,k-1}$ at a preceding time instant k−1 and for each antenna j of one or more of R receiving antennas; b) producing a first estimate $\hat{A}_k$ of the transmitted digital symbols at the current time instant k on the basis of the aforesaid frequency-domain channel-estimate vectors $\hat{H}_{j,k-1}$ at the preceding time instant k−1; c) computing an updated version of the frequency-domain channel-estimate vectors $\hat{H}_{j,k}$ at the current time instant k and for each antenna j of one or more of R receiving antennas on the basis of the received signal vector $Y_{j,k}$ at the current time instant k and for each antenna j of one or more of R receiving antennas, using the aforesaid estimate $\hat{A}_k$ of the transmitted digital symbols at the current time instant k as set of known transmitted digital symbols; d) using the aforesaid updated version of the frequency-domain channel-estimate vectors $\hat{H}_{j,k}$ at the current time instant k and for each antenna j of one or more of R receiving antennas, for equalizing the paths of the transmission channel and decoding the received signal vectors $Y_{j,k}$ at the current time instant k and for each antenna j of one or more of R receiving antennas; and e) storing the updated versions of the channel-estimate vectors for using them in steps a) and b) at the next time instant k+1.

7 Claims, 5 Drawing Sheets

(51) Int. Cl.
*H04L 25/02* (2006.01)
*H04L 27/26* (2006.01)

(56) References Cited

U.S. PATENT DOCUMENTS

| | | | |
|---|---|---|---|
| 6,452,936 B1* | 9/2002 | Shiino | 370/441 |
| 2002/0007252 A1* | 1/2002 | Sine et al. | 702/107 |
| 2002/0007257 A1* | 1/2002 | Riess et al. | 703/2 |
| 2004/0157554 A1* | 8/2004 | Wesel | 455/12.1 |
| 2010/0067629 A1* | 3/2010 | Gaddam et al. | 375/346 |

OTHER PUBLICATIONS

Park et al, Iterative Receiver with Joint Detection and Channel Estimation for ODFM System with Multiple Receiver Antennas in Mobile Radio Channels, 2001, IEEE.*

Park et al., Iterative Receiver with Joint Detection and Channel Estimation for ODFM System with Multiple Receiver Antennas in Mobile Radio Channels, 2001, IEEE.*

Park et al., Iterative Receiver with Joint Detection and Channel Estimation for OFDM System with Multiple Receiver Antennas in Mobile Radio Channels, 2001, IEEE.*

Search Report based on Italian Application Serial No. TO20090832, Ministero dello Sviluppo Economico, Sep. 20, 2010, pp. 3.

Seung Young Park, Yeun Gu Kim, Chung Gu Kang, and Dae Eop Kang, "Iterative Receiver with Joint Detection and Channel Estimation for OFDM System with Multiple Receiver Antennas in Mobile Radio Channels", Proceedings of the IEEE Global Telecommunications Conferenc., vol. 5, Nov. 25, 2001, pp. 3085-3089, XP010747377.

Seung Young Park, Yeun Gu Kim, Chung Gu Kang, "Iterative Receiver for Joint Detection and Channel Estimation in OFDM Systems under Mobile Radio Channels", IEEE Transactions on Vehicular Technology, vol. 53, No. 2, Mar. 1, 2004, pp. 450-460, XP011109375.

Lutz Jarbot, "Combined decoding and channel estimation of OFDM systems in mobile radio networks", in Proc. of IEEE Vehicular Technology Conference 1997, vol. 3, pp. 1601-1604, May 4, 1997.

Mehmet Kemal Ozdemir and Huseyin Arslan, "Channel Estimation for Wireless OFDM Systems," IEEE Communications Surveys & Tutorials, vol. 9, No. 2, 2nd Quarter 2007 pp. 18-48.

Emiliano Dall'Anese, Antonio Assalini, Silvano Pupolin, "On Reduced-Rank Channel Estimation and Prediction for OFDM-Based Systems", in Proc. WPMC07, Jaipur, India, Dec. 2007.

IEEE Std P802.11p, "Part 11: Wireless LAN Medium Access Control (MAC) and Physical Layer (PHY) specifications", Amendment 6: Wireless Access in Vehicular Environments, approved Jul. 15, 2010, pp. 51.

Paul Alexander and David Haley, "Outdoor Mobile Broadband Access with 802.11", IEEE Communications Magazine, Nov. 2007, pp. 108-114.

H. Abdulhamid, E. Abdel-Raheem and, K. E. Tepe, "Channel estimation for 5.9 GHz dedicated short-range communications receiver in wireless access vehicular environments", IET Communication, vol. 1, Dec. 2007, pp. 1274-1279.

Sheetal Kalyani and K. Giridhar, "Mitigation of Error Propagation in Decision Directed OFDM Channel Tracking using Generalized M Estimators", IEEE Transactions on Signal Processing, vol. 55, No. 5, pp. 1659-1672, May 2007.

Sheetal Kalyani and K. Giridhar, "Low Complexity Decision Directed Channel Tracking for High Mobility OFDM Systems", in Proc. of IEEE Int. Conf. on Communications 2009, pp. 5.

Shuichi Ohno and Georgios B. Giannakis, "Capacity Maximizing MMSE-Optimal Pilots for Wireless OFDM over Frequency-Selective Block Rayleigh-Fading Channels," IEEE Transactions on Information Theory, vol. 50, No. 9, Sep. 9, 2004, pp. 2138-2145.

Erik G. Larsson, Guoqing Liu, Jian Li, and Georgios B. Giannakis, "Joint Symbol Timing and Channel Estimation for OFDM Based WLANs," IEEE Communications Letters, vol. 5, No. 8, Aug. 2001, pp. 325-327.

\* cited by examiner

METHOD AND DEVICE FOR CHANNEL ESTIMATION, AND CORRESPONDING COMPUTER PROGRAM PRODUCT

PRIORITY CLAIM

The instant application claims priority to Italian Patent Application No. TO2009A000832, filed Oct. 28, 2009, which application is incorporated herein by reference in its entirety.

TECHNICAL FIELD

An embodiment of the present disclosure relates to wireless-communications techniques.

An embodiment of the disclosure has been developed with particular attention paid to its possible use for channel estimation and channel tracking in communications systems of an OFDM (Orthogonal Frequency-Division Multiplexing) type affected by time-variant fading phenomena.

BACKGROUND

The present disclosure will refer to various documents, which, in order not to burden the reader, are listed at the end of the disclosure itself and are recalled in the body of the disclosure with the number with which they appear in said list indicated in square brackets, i.e. [x].

In numerical, or digital, transmission systems, a technique for transmitting the bit generated by the source envisages grouping said bits in complex symbols that identify the amplitude and the phase of the signal used for modulating a carrier. Typical examples of this technique are the modulations known as QAM (Quadrature Amplitude Modulation) and PSK (Phase-Shift Keying). The complex symbols of a QAM (or PSK) scheme can be associated with m bit. The modalities with which the bits are associated with the $S=2^m$ complex symbols is referred to as "mapping", whilst the set of the symbols is referred to as "constellation".

For instance, the QPSK (Quadrature Phase-Shift Keying) technique refer to 4 complex symbols that may correspond, respectively, to the pairs of bits 00, 01, 10 and 11. Gray mapping is an example of known technique in which two adjacent complex symbols represent sets of bits that differ from one another at the most by one bit. The complex symbols may be represented in the complex plane where the two axes represent, respectively, the in-phase (I) component and the quadrature (Q) component of the complex symbol.

Figure 1:
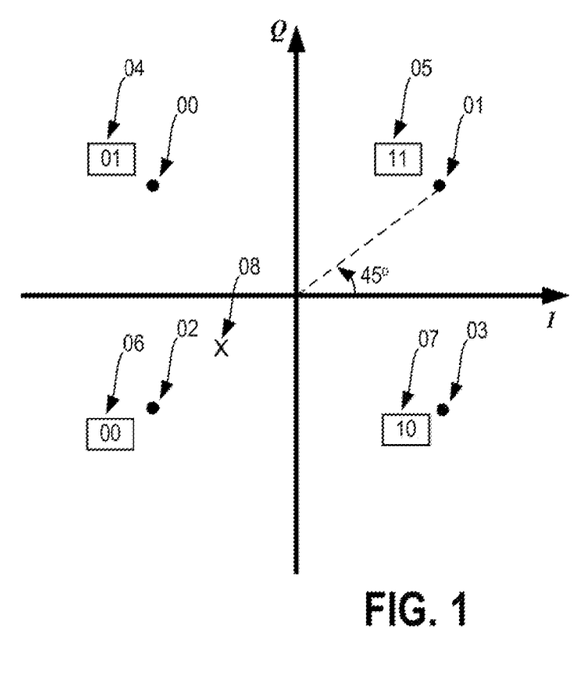

For instance, FIG. 1 illustrates an example of a QPSK constellation, which can represent the bits via a Gray-mapping rule (dots), together with a possible received symbol (cross).

The numeric data (bits or symbols) are transmitted on physical channels, which normally alter them on account of the additive noise. In addition to this, in wireless systems the channel is subject to fading with consequent phenomena of distortion (variations of phase and amplitude). This means that the data received do not coincide with the ones transmitted, rendering necessary an action of equalization for estimating the transmitted data. The channel coefficients may be estimated prior to said equalization and be known by the equalizer. The "robustness" of a connection used for the transmission depends upon the capacity of the receiver to detect in a reliable way the transmitted bits (i.e., to detect the transmitted 1's as 1's and the transmitted 0's as 0's).

A widely used modulation technique in the wireless context is the technique known as OFDM (Orthogonal Frequency-Division Multiplexing). OFDM systems envisage dividing the total flow of information that is to be transmitted into various flows, each of which having a lower data rate and being designed to modulate in frequency a respective "subcarrier" of the main carrier. Equivalently, the total bandwidth is divided into as many sub-bands, each centred on one of the subcarriers. This operating mode renders the communication more robust in a context of wireless channel subject to multipath fading and likewise simplifies the operations of equalization in frequency.

A sector of considerable potential interest for the use of said modulation techniques is constituted, among other things, by the applications known as vehicle-to-vehicle (or V2V) and vehicle to roadside-unit (or RSU), which is also known as vehicle-to-infrastructure (or V2I), applications. This applies in particular to the function of support of the applications regarding Intelligent Transportation Systems (ITS). Even though at the moment it does not exist an official classification of its applications, it is a very extensive set of applications that range from the improvement of the conditions of driver safety (which is a major purpose of said networks) to traffic control and to the reduction of traffic congestion, and to automatic toll collection.

For V2V and V2I applications, for which radiofrequency communications are required, an asserted standard is the one known as Dedicated Short-Range Communications (DSRC). This is a communication service for short or average distances that is able to support different applications (for example, public safety or else automatic toll collection) with a very low latency and a high data rate. As regards the physical layer (PHY) of DSRC technologies, the applications under study in various countries of the world are currently based prevalently upon the IEEE 802.11p standard [1], which is an extension of the IEEE 802.11 Wireless LAN (WLAN) specifications that is aimed at enabling the function known as Wireless Access in the Vehicular Environment (WAVE). The WAVE operating modes envisage data exchanges between vehicular devices in communication contexts that vary rapidly.

The IEEE 802.11p physical layer is very similar to current IEEE802.11 a/g standards, based upon an OFDM modulation, with the main difference represented by the use of the band around 5.9 GHz (5.85-5.925 GHz), instead of the 5.2-GHz band, and by a smaller bandwidth (10 MHz instead of 20 MHz).

In a physical layer (PHY) perspective, the application of a standard of an IEEE 802.11 type to mobile-communications systems comes up against some difficulties linked to the disturbance of the signal due to the radio channel.

For instance, phenomena of reflection and diffraction of the signal may give rise to multiple replicas of the transmitted signal, i.e., to multi-path phenomena. Each of said multi-path components may be characterized by a different phase and a different amplitude. The channel impulse response (CIR) in the discrete-time domain and the associated power-delay profile (PDP) enable representation of each multi-path contribution as a tap in the time domain. Each tap is typically expressed in the form of a complex value representing the respective contribution to the overall signal received, of which the modulus represents the associated level of intensity and the angle represents an associated phase rotation. The delay spread of the channel is the delay between the instant of arrival of the first multi-path contribution and the instant of arrival of the last multi-path contribution in the PDP. Frequently, a single value is used that takes into account each multi-path contribution in the form of a root-mean-square (RMS) time delay spread, which measures the dispersion of the delay around its mean value. The signal may be subjected to greater distortion by those channels that are characterized by a higher RMS delay spread. The time-domain multi-path effects admit of a dual representation in the frequency domain, where they determine the level of selectivity in frequency of the channel. This is measured via the coherence bandwidth, which is inversely proportional to the delay spread and represents the value of the frequency band in which the amplitude of the channel frequency response assumes an almost constant value.

As compared to the indoor propagation environment, the outdoor propagation environment is characterized in general by larger delay spreads. This in so far as the radio signal that propagates out of doors encounters obstacles, such as buildings and trees, that may give rise to multi-path effects due to reflection and/or diffraction that are located at greater distances from one another as compared to what occurs in indoor environments. As a result, the interference induced by the OFDM symbol transmitted previously, i.e., the inter-symbol interference (ISI) may arise in an outdoor environment much more frequently and intensely than in an indoor environment. An important characteristic of OFDM modulation is its capacity for mitigating multi-path effects through the inclusion of the guard interval (GI), i.e., a time interval purposely inserted between OFDM symbols transmitted in succession. If the GI is longer than the delay spread of the channel and the system is well synchronized, there is, theoretically, no inter-symbol interference. It should be noted that the reduction of bandwidth envisaged by IEEE 802.11p as compared to IEEE 802.11 a/g results in a longer duration of the GI that is able to cope with the major multi-path effect of urban environments.

Also the phase distortion in the frequency domain varies with time on account of the well-known Doppler shift, which derives from the relative movement between the transmitter and the receiver and is proportional to the speed of relative displacement. In non-line-of-sight (NLOS) configurations, on account of the presence of multiple reflections, the system becomes subject to multiple values of frequency shift, giving rise to the phenomenon known as Doppler spread. At the receiver, the Doppler spread can induce a considerable degradation of the performance, which may prove critical. The Doppler effect can also lead to a degradation of the orthogonality between the subcarriers, causing a single subcarrier to be subject to interference by the other subcarriers within one and the same OFDM symbol, thus giving rise to the phenomenon known as inter-carrier interference (ICI).

Furthermore, in OFDM systems designed for indoor use, the exposure to a multi-path propagation typical of an outdoor context can give rise, not only to inter-symbol interference, but also to greater difficulties in channel estimation. Moreover, mobility induces, within the duration of the individual packet, time-variable phenomena that may give rise to interference between the carriers such as to require techniques for tracking the variations of the channel after an initial estimate.

For these reasons, an advanced receiver designed to operate in an outdoor context and in conditions of mobility draws benefit, in terms of improvement of the performance, from the possibility of estimating/tracking the time-variant wireless channels with a frequency higher than what occurs for the static channels so as to take into account the presence of the Doppler effect. As illustrated in [2], improved techniques of channel estimate and tracking may represent an important factor for V2V/V2I receivers as compared to IEEE802.11 devices currently existing on the market.

SUMMARY

An embodiment is an improved technique for channel estimation that is able to track the variations of the channel in time thanks to an estimate of the demodulated data symbols; moreover, an embodiment suited for use in conjunction with a receiver with multiple receiving antennas.

An embodiment includes a method, and also regards a corresponding device, as well as a computer program product that can be loaded into the memory of at least one computer and comprises software-code portions that are able to implement the steps of the method when the product is run on at least one computer. As used herein, the reference to such a computer program product is understood as being equivalent to the reference to a computer-readable means containing instructions for control of the processing system for co-ordinating implementation of a method according to an embodiment. The reference to "at least one computer" is meant to highlight the possibility of an embodiment being implemented in a modular and/or distributed form. Furthermore, the claims may form an integral part of the technical teaching provided herein.

A particular possible application of an embodiment is channel estimation and tracking with the use of more reliable data symbols in addition to the known pilot symbols.

Various embodiments provide techniques that are able to estimate the channel and track its variations in OFDM systems, for example by tracking the channel variations exploiting both the pilot symbols and the detected symbols, i.e., in the framework of a channel-estimation (CE) technique that may be defined as "decision-directed" (DD).

Various embodiments are able to draw advantage from the presence of multiple receiving antennas, exploiting for example maximal-ratio-combining (MRC) techniques in at least some of the processing steps.

In various embodiments, the techniques of estimation of a DD type and of tracking of the channel itself may be based upon two steps:

i) estimation of the complex datum associated with the current OFDM symbol received, obtained using the channel coefficients estimated at the preceding OFDM symbol; and ii) estimation of the channel corresponding to the current OFDM symbol, performed using the information symbols just detected so as to provide a data matrix considered as constituted by known symbols.

In various embodiments, possible known pilot symbols—as specified in some wireless-transmission standards for purposes of correction of the phase and frequency offset and of tracking—may be added to the data matrix thus formed so that said matrix may be used for carrying out a subsequent refinement of the preceding channel estimation.

In this regard, the techniques of channel estimation of a decision-directed (DD) type may be exposed to phenomena of error propagation in the case where erroneous estimates of the data are used for updating the channel estimates, as documented in the literature, for instance in [3]-[6].

Various embodiments tackle the problem of limiting the propagation of the error in a simpler and in any case more effective way than known solutions. In particular, various embodiments envisage associating with the estimated symbols a reliability coefficient, and then making a choice or selection of the data symbols in order to select the most reliable data symbols, namely, the data symbols that may be considered correct with a high likelihood of success, at the same time avoiding any degradation of the precision of the estimate deriving from the use of incorrect data symbols in the channel-estimation process.

BRIEF DESCRIPTION OF THE DRAWINGS

One or more embodiments will now be described, purely by way of non-limiting example, with reference to the annexed representations, wherein:

FIG. 1 has already been partially described previously;

DETAILED DESCRIPTION

In the ensuing description, various specific details are illustrated and aimed at providing an in-depth understanding of the embodiments. The embodiments may be obtained without one or more of the specific details, or with other methods, components, materials, etc. In other cases, well known structures, materials, or operations may not be illustrated or described in detail so as not to render various aspects of the embodiments obscure.

Reference to "an embodiment" or "one embodiment" in the framework of this description is aimed at indicating that a particular configuration, structure, or characteristic described in relation to the embodiment is included in at least one embodiment. Hence, phrases such as "in an embodiment" or "in one embodiment" that may be present in different points of this description do not necessarily refer to one and the same embodiment. Furthermore, particular aspects, structures, or characteristics may be combined in any adequate way in one or more embodiments.

The references used herein are only adopted for reasons of convenience and hence do not express the purpose or the meaning of the embodiments.

In FIG. 1, the four symbols of the constellation are designated as 00, 01, 02 and 03, whilst the corresponding pairs of bits obtained with Gray mapping are indicated in blocks 04, 05, 06 and 07 and correspond, respectively, to the pairs of bits 01, 11, 10 and 00. Indicated with a cross is also a possible symbol 08 as received, which, as a result of the effects of degradation (noise and distortion) produced by the channel, does not correspond to any symbol transmitted.

Figure 2:
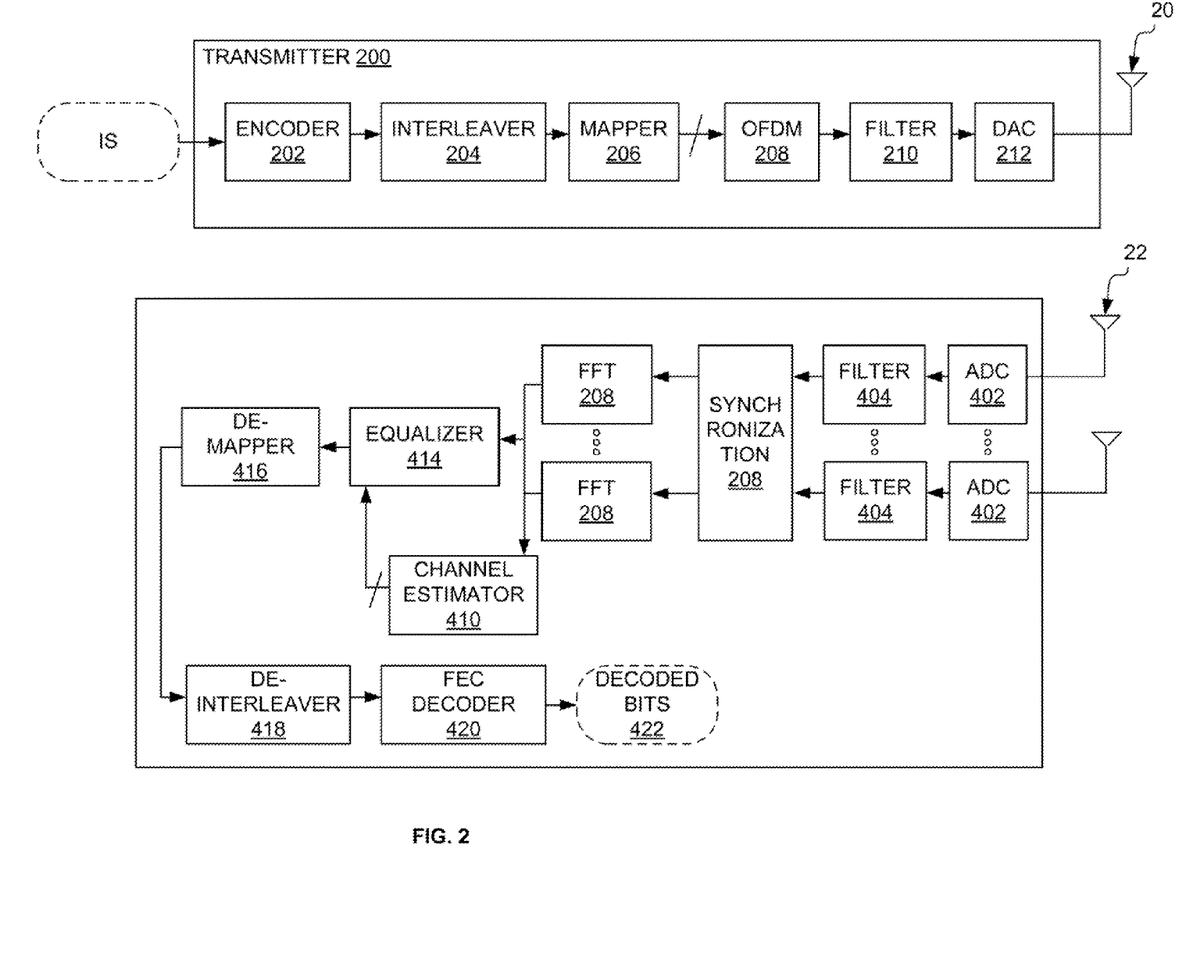
FIG. 2 is a general layout of an embodiment of a communications system.

FIG. 2 illustrates the general scheme of a communications system comprising a transmitter 200 designed to receive at input a signal in the form of source bits IS and to transmit said signal over one (or more) channels comprised between a transmitting antenna 20 and a plurality of receiving antennas 22 coming under a receiver 400.

The structure represented in FIG. 2 corresponds to the presence of the following functional blocks or modules:

Transmitter 200
202: encoding (for example, FEC—Forward Error Control)
204: interleaver
206: mapper
208: OFDM modulation (for example, IFFT)/insertion of protection or guard interval (GI)
210: filter
212: digital-to-analog converter
Receiver 400
402: analog-to-digital converters
404: filters
406: synchronization
408: removal of GI/OFDM demodulation (FFT)
410: channel estimator
414: equalizer
416: de-mapper, calculation of log-likelihood ratios (LLRs) of bits
418: de-interleaver
420: FEC decoder
422: decoded bits.

In said diagram, the de-interleaver 418 implements a law of reciprocal permutation with respect to that of the interleaver block 204. As regards the FEC encoder 202 and the corresponding FEC decoder 420, various embodiments may use encoding schemes of a Reed-Solomon, convolutional, low-density parity-check, and turbo-encoding types.

It will likewise be appreciated that various embodiments described herein are in no way linked in a binding way to the specific configuration represented by way of illustration in FIG. 2. This applies, by way of example, to the blocks functioning as interleaver 204 and de-interleaver 418, the presence of which, like the presence of other blocks represented in FIG. 2, is—except for what is explicitly said in what follows—in no way imperative.

Various embodiments considered herein mainly regard the function of the channel estimator 410, which, as may be appreciated from FIGS. 3 to 6, has associated a memory 412 and an equalizer 414.

In the embodiments considered herein, the channel estimator 410 is of the decision-directed (DD) type and receives as input at the k-th time instant:

the reception vector $Y_{j,k}$, which is expressed in the frequency domain and comprises M elements (where M is the number of the OFDM subcarriers per symbol), i.e., in the case of multiple receiving antennas, a vector for each of the receiving antennas 22 (which will be assumed as being present in a number equal to R, hence with j=1, ..., R); and the frequency-domain channel-estimate (CE) vector or vectors $\hat{H}_{j,k-1}$, once again, in the case of multiple receiving antennas, one for each receiving antenna (j=1, ..., R) and each comprising M elements, determined at the (k−1)-th time instant and stored in the memory 412.

As illustrated in FIGS. 3 to 6, the channel estimator 410 emits at the time instant k the updated channel-estimate (CE) vectors, designated by $\hat{H}_{j,k}$ (note that in FIGS. 3 and 4 for reasons of brevity the index j is omitted in the vector $\hat{H}_{j,k-1}$, which corresponds to a single receiving antenna, i.e., R=1), obtained for instance as described in what follows. The output of the channel estimator 410 is sent to the channel equalizer 414 and is used for determining the final estimates of the symbols transmitted $\hat{A}'_k$, which are then sent at input to the demapper 416, which produces the LLRs to be supplied to the de-interleaver 418 and finally to the FEC decoder 420 to reach a final decision on the decoded information bits.

Figure 3:
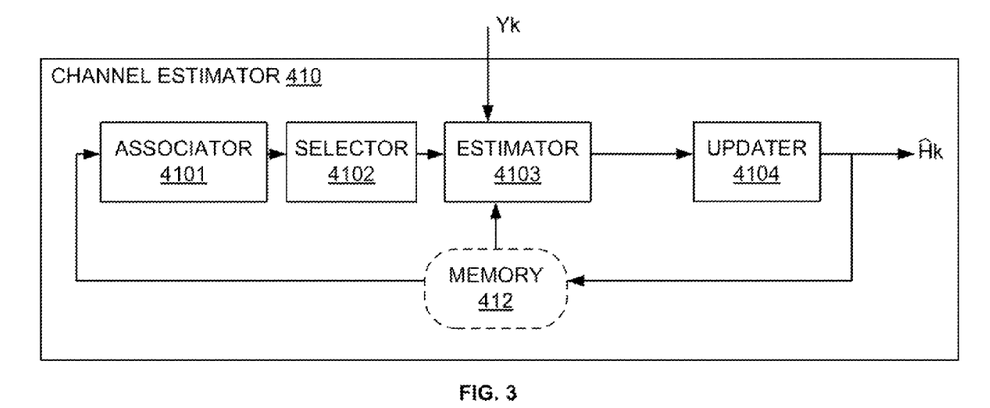
FIGS. 3 and 4 illustrate embodiments of channel estimators for a single receiving antenna.
Figure 5:
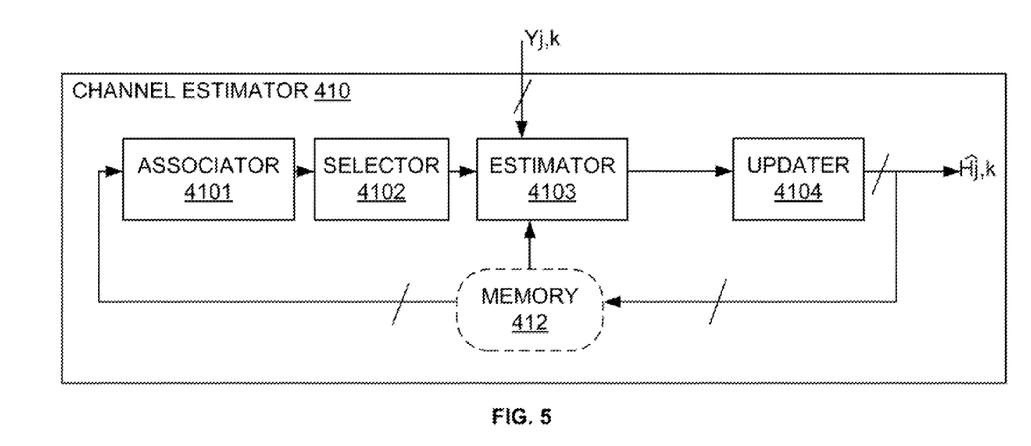
FIGS. 5 and 6 illustrate embodiments of channel estimators with multiple receiving antennas.

In one embodiment, the R estimates of channel frequency response (CFR) at input at the time instant k−1, $\hat{H}_{j,k-1}$ are read starting from the memory block 412 and then transferred to a block 4101, which has the function of associating with said estimates—according to the modalities described more fully in what follows —corresponding reliability coefficients so as to enable the subsequent block 4102, which will also be described more fully in what follows, a function of selection of the most reliable symbol estimates to be performed.

These are used for making, in a block 4103, a first estimate of the data $\hat{D}_k$, for instance, via a simple detection function of a hard-data-detection (HDD) type. Said first estimate of the data is then used by a block 4104 with function of estimator of the R CFRs for computing an updated version of the R channel estimates at the time instant k, designated by $\hat{H}_{j,k}$ (j=1, ..., R).

As will be appreciated better still in what follows, the various embodiments are irrespective of the specific modalities of embodiment of the CFR-estimation function. This function may then be conducted on the basis of any method of channel estimation of a known type, which renders superfluous any detailed description herein. For instance, there exist CE techniques that exploit the knowledge of an estimate of the length of the channel impulse response, according to an approach denoted at times as "reduced-rank approach". However, an embodiment may be applied independently of the fact that the channel-estimation technique is of a reduced-rank or full-rank type [7]. Other examples of CFR-estimation methods known in the literature are given in [9], [10].

Figure 4:
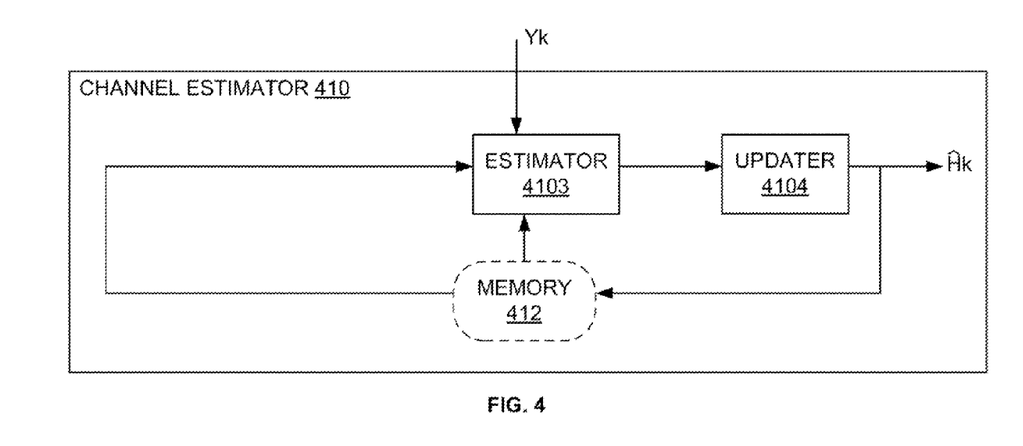
Figure 6:
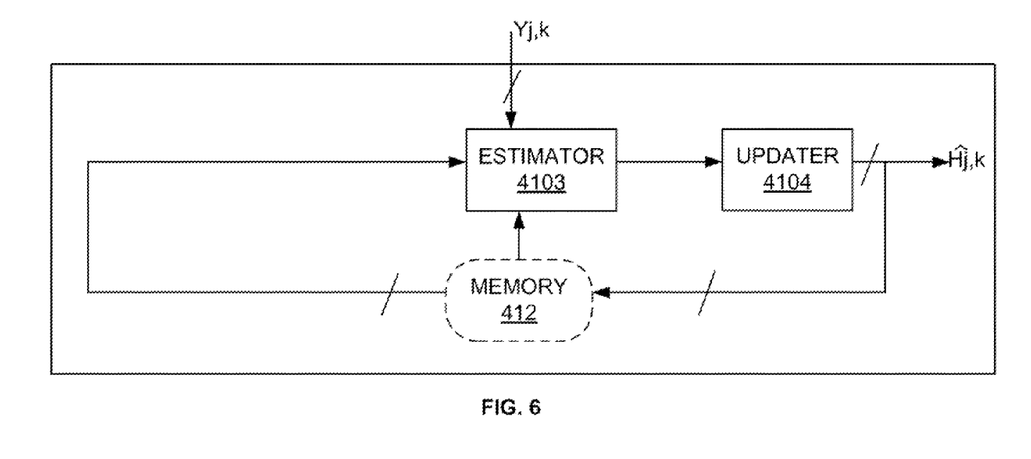

The embodiments considered in FIGS. 4 and 6 may be viewed as a simplified version of the embodiments of FIGS. 3 and 5, respectively, in which it is possible to do without blocks 4101 and 4102, i.e., without the functions of association of the reliability coefficients and coefficients of selection of the most reliable symbol estimates. In this case, all the data symbols are estimated starting from $\hat{Y}_{j,k}$ using $\hat{H}_{j,k-1}$.

If an OFDM system is considered, characterized by a total bandwidth B, by the use of M subcarriers for each OFDM symbol, and where $L_{cp}$ is the number of samples used for the cyclic extension of prefix (guard interval, or GI) of an OFDM symbol, then $T_c=1/B$ can be assumed as channel-sampling time with $\Delta f_c=B/M$ as spacing in frequency between the subcarriers. In this case, the duration of an OFDM symbol is given by $T=(M+L_{cp})T_c$.

For reasons of simplicity, first the case of a single receiving antenna will be considered. Then, the case of multiple receiving antennas 22 will be treated, which corresponds to the general scheme of FIG. 2.

A point-to-point wireless connection affected by multipath fading may be modelled by resorting to the well-known time-variant and time-discrete channel model known as wide-sense-stationary uncorrelated scattering (WSS-US), where the channel impulse response (CIR) in the time domain has $L_{ch}$ discrete values or taps with spacing $T_c$ in the form:

$$h(kT, nT_C) = \sum_{l=0}^{L_{ch}-1} h_l(kT)\delta(nT_C - lT_C) \quad (1)$$

where $L_{ch}$ is the number of significant taps at the time instant kT.

In OFDM systems blocks of M complex symbols are transmitted in parallel on M distinct sub-channels.

The vector of the M complex symbols that are transmitted simultaneously at a given time instant kT and that modulate the M subcarriers can be expressed in the form:

$$A_k(kT)=[A_{k,0} A_{k,1} \ldots A_{k,M-1}]^T \quad (2)$$

where each symbol $A_{k,m}$ belongs to a generic complex constellation (for example, PSK or QAM) and $X^T$ indicates the transpose of the generic vector (or matrix) X.

A cyclic extension prefix (or guard interval) $L_{cp}$ is set in front of each modulated OFDM symbol. The model expressed by Eq. (1) assumes that the channel remains static for the duration of an OFDM symbol, but that it can change for subsequent symbols on the basis of a given Doppler spectrum D(f) with bandwidth $f_D$.

In this case, inter-carrier interference (ICI) is not explicitly present; however, it may be shown that the contribution of said interference may be approximated in the form of a degradation of the signal-to-noise ratio (SNR), which is in any case negligible for relative speeds between transmitter and receiver (i.e., for relative speeds, with reference to the vehicular applications considered in the introductory part of the description) at least up to values in the region of v=200 km/h.

After a time-frequency synchronization, which is assumed ideally perfect for purposes of the following description, and removal of the cyclic prefix at the receiver (and if moreover inter-symbol interference is not present in so far as $L_{ch} \leq L_{cp}$), the OFDM signal with M input values after the Fourier transform (FFT) at the time instant k-th (kT), which can be expressed as $Y_k$, can be written in compact form as $$Y_k = D_k H_k + n_k \quad (3)$$

where $D_k = \text{diag}(A_k)$ is a diagonal matrix M×M having the elements of $A_k$ on the diagonal. In said expression, $H_k = [H_{k,0} H_{k,1} \ldots H_{k,M-1}]^T$ is the vector of the M coefficients of the CFR on the m-th subcarrier at the time instant kT and is given by $$H_{k,m} = \sum_{l=0}^{L_{ch}-1} h_l(kT)\exp(-j2\pi lm/M) \quad (4)$$

and $n_k = [n_{k,0} n_{k,1} \ldots n_{k,M-1}]^T$ represents the samples of the additive white Gaussian noise (AWGN) in the frequency domain.

An embodiment of the channel-estimation technique of a decision-directed (DD) type envisages using an initial channel estimate for demodulating the first OFDM data symbol received. As example, reference may be made to the WLAN OFDM packet-frame structure corresponding to the IEEE 802.11 (a/g/p) standard. This structure, recalled in the document [1] and again in FIG. 7, is in general constituted by a preamble followed by a signal field and by a data field.

Figure 7:
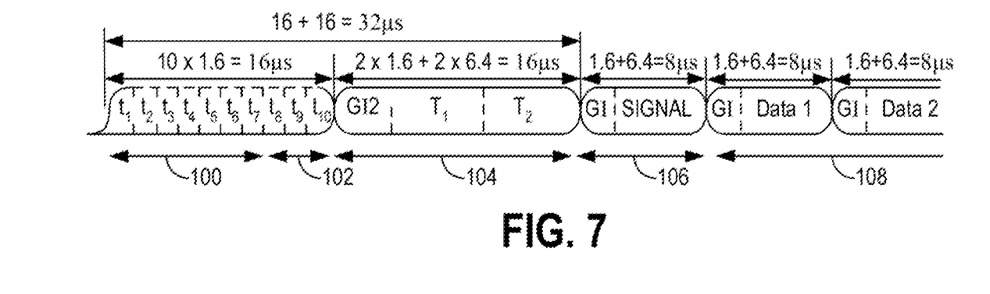
FIG. 7 is a diagram representing an embodiment of a frame structure in a WLAN context.

In particular, the various fields designated by 100, 102, 104, 106 and 108 in FIG. 7 correspond to the following functions:

100: signal detection, automatic control of the gain, diversity selection;
102: rough estimation of the frequency offset and temporal synchronization;
104: channel estimation and refined estimation of the frequency offset;
106: indication of rate length;
108: service and data information.

In greater detail, the preamble is constituted by:

a) a short training sequence (STS) that includes 10 short and equal symbols of index $t_i$, i=1, ... 10, each of which has a "length" (namely, a number of samples) $N_s=16$.

b) a guard interval (GI2) of length $N_{GI2}=32$.

c) a long training sequence (LTS), constituted by two equal OFDM symbols ($T_1$, $T_2$) of length $N_L=M=64$ (with M that is, as always, the number of the subcarriers in an OFDM symbol).

The signal field is an OFDM symbol of length $N_d=M=64$ extended cyclically with a guard interval (GI) of length $N_{GI}=L=16$. The data field contains a variable number of OFDM symbols to be transmitted, also referred to as payload symbols. Each symbol is cyclically extended with a guard interval GI of length $N_{GI}=L=16$.

The initial CE is calculated starting from the initialization sequence LTS. Subsequently, since this has to do with a time-variant transmission connection, the estimate of the channel impulse response (CIR) is updated using both the pilot subcarriers and data symbols detected in the signal and data fields.

The document [8] illustrates possible motivations of the choice of a CE technique of a decision-directed type. Here it may be seen that four pilot tones as in the case of the IEEE 802.11 specifications are not usually sufficient if the channel length (namely, the number of nonzero taps in the time-domain channel impulse response CIR) is such that $L_{ch}>4$, and in particular that, to obtain a reliable channel estimate, the minimum number of known data symbols must be at least equal to the number of the taps in the channel impulse response (CIR), namely, $K \geq L_{ch}$.

There now follows a description, provided by way of example, of an embodiment of a method of initial channel estimation based upon a time-domain least-square (TD-LS) approach. Once again it will be understood that the embodiments described herein are in no way bound to the adoption of said technique, which is referred to herein purely by way of example.

To simplify the presentation, the channel length $L_{ch}$ is here considered as being known (for example following upon a previous estimation). This does not on the other hand imply any loss of generality in the description: what is said hereinafter applies in fact in an identical way to the case where reference is made to a method of channel estimation that is not based upon knowledge of the length $L_{ch}$.

Such an approach may also be justified by the fact that the channel impulse responses (CIRs) may have a finite length much shorter than M and likely to be in the range of the value $L_{cp}$. For this reason, there may be interest in increasing the precision of channel estimation considering a channel impulse response (CIR) that has a fixed length $r=L_{ch} \leq L_{cp}$.

In this case, using the notation of formula (3) the reduced-rank (RR) estimator TD-LS minimizes the functional which can be expressed (omitting the temporal index k) in the form:

$$\|Y - DF_r \hat{h}_{r,LS}\|^2 \quad (5)$$

where the vector $\hat{h}_{r,LS}$ is the unknown vector of r elements that represents the channel impulse response (CIR) estimated in the time domain (TD) assuming r nonzero components, and where $F_r$ is the M×r matrix obtained from the discrete Fourier transform (DFT) matrix F, keeping the first r columns. The diagonal matrix comprises on the diagonal the M values of the LTS sequence corresponding to a sequence of known symbols, such as, for example:

$A_{LTS} = [0\ 1\ -1\ -1\ 1\ 1\ -1\ 1\ -1\ -1\ -1\ -1\ -1\ 1\ 1\ -1\ -1\ 1\ -1$
$1\ -1\ 1\ 1\ 1\ 1\ 0\ 0\ 0\ 0\ 0\ 0\ 0\ 0\ 0\ 0\ 1\ 1\ -1\ -1\ 1\ 1\ -1\ 1\ -1\ 1\ 1\ 1\ 1$
$1\ 1\ 1\ -1\ -1\ 1\ 1\ -1\ 1\ -1\ 1\ 1\ 1\ 1]^T$.

For reasons of simplicity, it is recalled that the DFT matrix F is defined as a matrix having as elements $[F]_{m,l} = \exp(-j2\pi lm/M)$, $m,l=0,\ldots M-1$ where M is the number of points of the DFT (in the present case, M=64).

The solution is represented by $$\hat{h}_{r,LS} = (DF_r)^+ Y = (F_r^H D^H D F_r)^{-1} F_r^H (D^H Y) \quad (6)$$

and the channel frequency response (CFR) estimated may be expressed as $$\hat{H}_{r,LS} = F_r \hat{h}_{r,LS} = F_r (F_r^H D^H D F_r)^{-1} F_r^H (D^H Y) \quad (7)$$

On the other hand, it is noted that the reduced-rank (RR) estimation is more burdensome from the computational standpoint with than a full-rank solution $\hat{H}$, which does not require an estimate of the channel length:

$$\hat{H} = D^{-1} Y \quad (8)$$

However, the precision of the estimate $\hat{H}_{r,LS}$ is greater than that of $\hat{H}$.

An embodiment of a decision-directed (DD) type is articulated on two successive steps.

The first step is an estimate of the data for the k-th OFDM symbol received, data which are grouped together in the vector $\hat{A}_k$, the input data of which are $\hat{A}_{k,m}$. Said estimate may be made, for example, using a hard-data-detection (HDD) function (block 4103 of FIGS. 3 and 4) for instance, via a zero-forcing-equalization (ZFE), using the channel frequency response $\hat{H}_{k-1}$ estimated at the (k−1)-th OFDM symbol:

$$\hat{A}_{k,m} = Y_{k,m} \hat{H}_{k-1,m}^{-1}, m \in S_d \quad (9)$$

where $S_d$ is the set of the indices of the data subcarriers.

For instance, for the IEEE 802.11p systems, $S_d$ comprises 48 elements: $S_d = [2, 3, 4, 5, 6, 7, 9, 10, 11, 12, 13, 14, 15, 16, 17, 18, 19, 20, 21, 23, 24, 25, 26, 27, 39, 40, 41, 42, 43, 45, 46, 47, 48, 49, 50, 51, 52, 53, 54, 55, 56, 57, 59, 60, 61, 62, 63, 64]$.

A diagonal matrix having $\hat{A}_k$ as diagonal is designated by $\hat{D}_k$.

It is on the other hand to be understood that the reference to this particular embodiment is provided purely as an example. Various embodiments may in fact use other equalization techniques, for example, techniques based upon a minimum mean-square error (MMSE) criterion.

In a second step, the channel frequency response (CFR) corresponding to the k-th OFDM symbol, which is designated by $\hat{H}_k$ and may change with respect to $\hat{H}_{k-1}$ following upon the time-variant behaviour of the channel, is again estimated, for example, using formulas (7) or (8) substituting D with $\hat{D}_k$, i.e., using the new information symbols detected, which are thus added to the known pilot symbols (if they exist).

Then, the updated channel estimate $\hat{H}_k$ is used upon reception of the next OFDM symbol to set under way a new iteration of the procedure and in particular to be employed by the equalizer for demodulating the OFDM symbol received and supplying at output the corresponding demodulated data vector $A'_k$.

Figure 8:
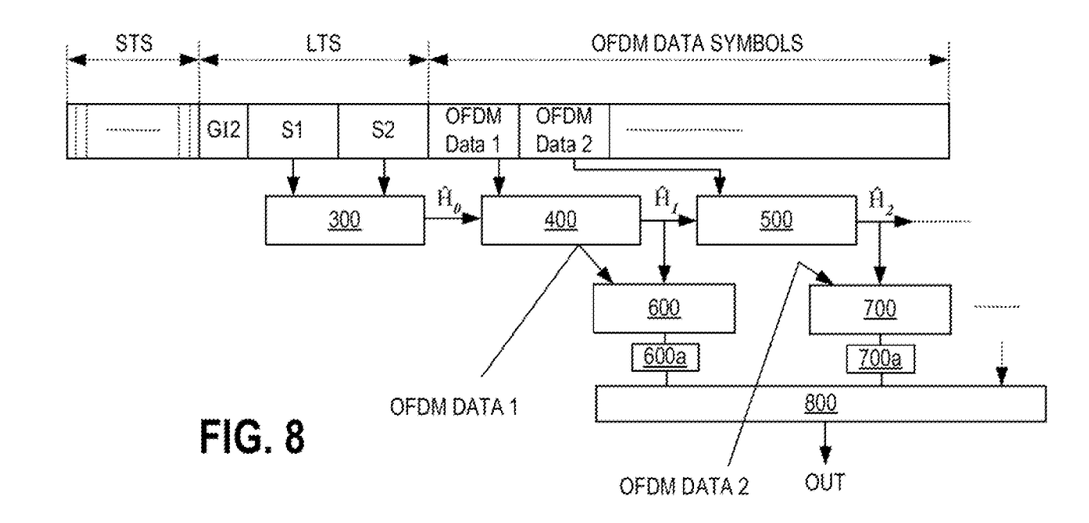
FIG. 8 illustrates operating criteria of embodiments.

FIG. 8 is a functional diagram representing the operations performed by the receiver. In particular, in the diagram of FIG. 8, block 300 indicates the first channel-estimation function performed starting from the symbols S1, S2, whilst blocks 400 and 500 represent the subsequent estimates $\hat{H}_{k-1}$ with k=0, 1, 2 carried out by blocks 4101 and 4102 (if present), the hard-detection function (block 4103), with the consequent operations of channel estimation. Blocks 600 and 700 indicate the corresponding functions of channel equalization, the channel being of a time-variant type, and of demapping (generation of the soft values at output). Blocks 600a and 700a indicate the de-interleaving function, whilst block 800 indicates in general the function of decoding of the data symbols that underlies generation of the output signal (see also block 420 of FIG. 2).

As already mentioned previously, in forming the matrix of the estimated data $\hat{D}_k$ using a sequence of known symbols, it may be convenient to seek to reduce the error propagation in the case of a detection of non-accurate data. In fact, the channel estimate $\hat{H}_{k-1}$ used for computing $\hat{D}_k$ is older by a symbol time than the effective channel at the instant considered so that in $\hat{D}_k$ there may be present errors in the case of a time-variant channel.

Consequently, the subcarrier-index set $S_d$ to be considered may be determined using various embodiments that correspond alternatively to:

determining $\hat{A}_k$ (and $\hat{D}_k$) using all the data symbols of the OFDM symbol information just detected; or else, applying a procedure or symbol-selection algorithm (SSA) (modules 4102 of FIGS. 3 and 5) for selecting the most reliable data symbols, namely, the data symbols that may be considered correct with highest likelihood of success; by resorting to such an embodiment, it may be possible to prevent degradation of the precision of the estimate deriving from the use of incorrect data symbols in the channel-estimation process.

Such a symbol-selection function may use, in the embodiments referred to in FIG. 3, a reliability-coefficient-assignment (RCA) function to each data symbol received in order to estimate its reliability. The data symbols with highest reliability-coefficient (RC) values have a greatest probability of being correct and, consequently, may be considered reliable. On the other hand, the data symbols with low RC values may be labelled as "unreliable" and hence not used for the purposes of channel estimation.

For instance, in the case of a single receiving antenna, the reliability coefficient (RC) may be chosen in the form:

$$\psi_{k,m} = |H_{k-1,m}|^2 \tag{10}$$

Albeit in its simplicity, this criterion represents a good metric for evaluation of the reliability of the data symbols. Evaluations of both a theoretical and a practical nature of the system performance on channels subject to fading indicate in fact a dependence upon the squared amplitude of the CFR at the subcarrier considered. The choice of the most reliable symbols to be used for performing the channel-tracking function may reduce the possible propagation of errors in channel estimation caused by the use of symbols detected in an erroneous way. For the purposes of the choice, a possibility is that of defining a threshold $\psi_{thr}$ causing the symbols for which the RC value is such that $\psi_{k,m} > \psi_{thr}$ are considered reliable.

Tests show that in an embodiment, an optimal choice of the threshold depends upon various system and channel parameters. The same tests, on the other hand, show that a heuristic choice of a fixed value $\psi_{thr}$ proves more than satisfactory for a wide range of applications.

A possible sequence of performance of the symbol-selection-algorithm (SSA) function (block 4102) is described in what follows.

The pilot symbols are considered such as to have the maximum reliability, so that the pilot symbols available $N_p$ are entered in $\hat{A}_k$ (in the case considered in the document [1] there are $N_p=4$ subcarrier indices) in the set of the symbols selected.

The reliability coefficient (RC) $\psi_{k,m}$ is then calculated for the entire set $S_d$ of the indices m of the OFDM data carriers in an OFDM symbol.

Hence, for each value of m it is verified whether $\psi_{k,m} \geq \psi_{thr}$ and then:

if the condition is satisfied, the m-th data symbol is included in $\hat{A}_k$;

if the condition is not satisfied, the symbol is rejected.

Finally, if the dimension $N_s$ of the vector $\hat{A}_k$ is such that $N_s = N_d + N_p \leq L_{ch}$, (where $N_d$ is the number of the data carrier selected), then the $L_{ch} - N_s$ symbols with the highest reliability-coefficient (RC) value amongst the symbols rejected are entered into the selected set. This implies keeping an ordered list of the values of the reliability coefficient (RCs) associated to the symbols.

In various embodiments, the channel-estimation function (module 4104 of FIGS. 3 to 6) envisages applying the vector $\hat{A}_k$ determined according to the modalities seen previously, possibly adopting the selection function of the most reliable symbols described previously with reference to FIG. 3 or else taking into account all the estimated data symbols if said function is not applied, as occurs in the case of FIG. 4 in order to compute the CFR, designated by $\hat{H}_k$ updated at the time instant k under observation. This may occur, for example, with formulas (7) and (8).

The updated values $\hat{H}_k$ are stored in the memory 412 and used at the (k+1)-th time instant for the subsequent iteration, in particular being entered in the equalizer for demodulating the OFDM symbol received and determining the corresponding estimation of the information vector $\hat{A}'_k$.

In summary, various embodiments of the channel-estimation solution of a decision-directed type here considered envisage, prior to the demodulation of each OFDM symbol received, a processing sequence, which, in the case of the embodiment of FIG. 3, envisages:

reliability-coefficient assignment (RCA) (block 4101) using the channel frequency response calculated in the preceding iteration, adopting for example the metric expressed by formula (10);

the selection (SSA) (block 4102) conducted on the basis of the reliability coefficients calculated previously;

a hard data detection (HDD) (block 4103) performed, for instance, by selecting the symbols of the constellation that are at the minimum Euclidean distance from the data received using the channel estimate of the preceding iteration; for the purposes of equalization it is possible to use a zero-forcing (ZF) function or a function based upon the minimum mean-square error (MMSE); and the current channel estimate (block 4104).

The above applies in a dual way also to the embodiment referred to in FIG. 4, which envisages doing without the reliability coefficient assignment (RCA) function (block 4101) and the symbol-selection (SSA) function (block 4102). In this case, the set $S_d$ comprises all the entire indices of the data subcarriers, with the treatment operations represented in detail in the block diagrams of FIG. 4.

An embodiment described previously with reference to a single receiving antenna may be extended to the case of multiple receiving antennas, i.e., to a system of the type commonly referred to as single-input/multiple-output (SIMO) provided with multiple receiving antennas 22 (see FIG. 2), for example R receiving antennas. This case is referred to in FIG. 5 in the case where the function of selection of the most reliable symbols (SSA function) is present and in FIG. 6 in the simplified case where said function is not present.

An embodiment of the channel-estimation technique expressed by formula (7) may be directly extended by estimating simply each of the propagation connections. In this case, the CIR for the j-th receiving antenna estimated in the time domain (TD) and having reduced rank, which is expressed as $\hat{h}_{j,r,LS}$, is given by $$\hat{h}_{j,r,LS} = (DF_r)^+ Y_j = (F_r^H D^H D F_r)^{-1} F_r^H (D^H Y_j) \tag{11}$$

where $Y_j$ is the OFDM symbol received by the j-th antenna, with j=1, ..., R.

The R CFRs can thus be expressed as $$\hat{H}_{j,r,LS} = F_r \hat{h}_{j,r,LS} = F_r (F_r^H D^H D F_r)^{-1} F_r^H (D^H Y_j) \tag{12}$$

In a similar way, the full-rank solution expressed by the relation (8) is modified as follows:

$$\hat{H}_j = D^{-1} Y_j \tag{13}$$

Also in the case of a SIMO system, the channel estimation of a decision-directed type with tracking envisages two main steps.

The first step is the estimation of the data $\hat{A}_k$ of the k-th OFDM symbol received (with input data $\hat{A}_{k,m}$), implemented for example via a maximal-ratio-combining (MRC) function, which may be expressed by the formula $$\hat{A}_{k,m} = \frac{\sum_{j=1}^{R} Y_{j,k,m} \hat{H}_{j,k-1,m}^{*}}{\sum_{j=1}^{R} |\hat{H}_{j,k-1,m}|^{2}}, \quad m \in S_d \quad (14)$$

where the indices j,k,m of the received symbol Y in the frequency domain and the channel estimate Ĥ refer, respectively, to the receiving antenna (j), to the time instant (k), and to the OFDM subcarrier (m).

On the other hand, it is appreciated that it may be possible to use other equalization or combination techniques, such as, by way of example, equal gain combining (EGO), without this implying any limitation to the generality of the embodiments described herein. Also in this case, the corresponding diagonal matrix having as diagonal $\hat{A}_k$ is designated by $\hat{D}_k$.

The CFR corresponding to the k-th OFDM symbol $\hat{H}_{j,k}$ for each of the receiving antennas (j=1, . . . , R) may possibly change with respect to $\hat{H}_{j,k-1}$ in view of the time-variant behavior of the channel and may be estimated again for each of the receiving antennas, using, for example, formula (12) or formula (13) and substituting D with $\hat{D}_k$ starting from formula (14), i.e., using the new information symbols detected, which are then added to the known pilot symbols (if present) to form an extended matrix of the known data.

Finally, the updated channel estimation $\hat{H}_{j,k}$ is used for receiving the subsequent OFDM symbol for setting under way a new iteration of the procedure, in particular, via use by the equalizer (for instance, with the MRC or EGO technique), for demodulating the OFDM symbol received and supplying the corresponding demodulated-data vector $\hat{A}'_k$.

In the case of a SIMO system, the selection function represented by blocks 4102 of FIG. 5 may be modified as regards the values of the reliability coefficients (RCs) assigned by blocks 4101, with respect to the analogous block of FIG. 3.

As regards determination of the reliability coefficient associated with a certain subcarrier it is possible to refer to different embodiments.

For instance, it may be possible to use a reliability coefficient based upon the sum of the squares of the amplitudes of the channel coefficients on the various receiving antennas; namely, $$\psi_{k,m} = \sum_{j=1}^{R} |H_{j,k-1,m}|^{2} \quad (15)$$

It may also be possible to use the best value of the squared amplitude from amongst the ones detected on the R connections in reception; namely, $$\psi_{k,m} = \max_{j} |H_{j,k-1,m}|^{2} \quad (16)$$

Tests show that the two examples considered lead to substantially identical levels of performance. Once the RCs have been calculated, it is possible to use a symbol-selection-algorithm (SSA) function (blocks 4102) of the type considered previously, namely, a threshold $\psi_{thr}$ that is fixed and such that only the symbols whereby $\psi_{k,m} \geq \psi_{thr}$ are selected.

Also in this case (i.e., SIMO system) and with reference to the basic scheme of FIG. 5, the channel-estimation procedure of a decision-directed type may hence envisage, prior to treatment of demodulation of each OFDM symbol received, a sequence comprising:

the reliability coefficient assignment (RCA) (block 4101) by using the channel frequency response calculated in the preceding iteration, for example with reference to the metric expressed by formula (15) or formula (16);
the symbol selection (SSA—block 4102) formula using the reliability coefficients previously calculated;
the hard-data detection (block 4103), implemented, for instance, by selecting the symbols of the constellation that have a minimum Euclidean distance from the received data and using the channel equalization performed in the preceding iteration; once again for the purposes of equalization, techniques of an MRC or EGC type may be used; and
the current channel estimation for the various multiple connections of the receiver.

Moreover, as in the case of the single receiving antenna, it may also be possible to do without the reliability-coefficient-assignment (RCA) function (block 4101) and the function of selection of the most reliable symbols (SSA) (blocks 4102) according to the criteria referred to in FIG. 6. In this case, the set $S_d$ comprises all the indices of the data subcarriers.

Of course, without prejudice to the principles of the disclosure, the details of implementation and the embodiments may vary, even significantly, with respect to what has been illustrated herein purely by way of non-limiting example, without thereby departing from the scope of the disclosure.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

List of the References Contained in the Description

[1] IEEE Std P802.11p, "Part 11: Wireless LAN Medium Access Control (MAC) and Physical Layer (PHY) specifications", Amendment 6: Wireless Access in Vehicular Environments, approved July 2010

[2] P. Alexander et al., "Outdoor Mobile Broadband Access with 802.11", IEEE Communications Magazine, November 2007, pp. 108-114.

[3] L. Jarbot, "Combined decoding and channel estimation of OFDM systems in mobile radio networks", in Proc. of IEEE Vehicular Technology Conference 1997, Vol. 3, pp. 1601-1604, May 1997.

[4] H. Abdulhamid, E. Abdel-Raheemand, K. E. Tepe, "Channel estimation for 5.9 GHz dedicated short range communications receiver in wireless access vehicular environments", IET Communication, vol. 1, pp. 1274-1279, dec. 2007.

[5] S. Kalyani and K. Giridhar, "Mitigation of Error Propagation in Decision Directed OFDM Channel Tracking using Generalized M Estimators", IEEE Trans. on Signal Processing, vol. 55, pp. 1659-1672, May 2007.

[6] S. Kalyani and K. Giridhar, "Low Complexity Decision Directed Channel Tracking for High Mobility OFDM Systems", in Proc. of IEEE Int. Conf. on Communications 2009.

[7] E. Dall'Anese, A. Assalini, S. Pupolin, "On Reduced rank Channel Estimation and Prediction for OFDM-based Systems", in Proc. WPMC07, Jaipur, India, Dec. 2007.

[8] S. Ohno and G. B. Giannakis, "Capacity Maximizing MMSE-Optimal Pilots for Wireless OFDM over Frequency-Selective Block Rayleigh-Fading Channels," IEEE Trans. Inf. Theory, vol. 50, no. 9, pp. 2138-2145, September 2004.

[9] E. G. Larsson, G. Liu, J. Li, and G. B. Giannakis, "Joint Symbol Timing and Channel Estimate for OFDM Based WLANs," IEEE Commun. Letters, vol. 5, no. 8, pp. 325-327, August 2001.

[10] M. K. Ozdemir and H. Arslan, "Channel Estimation for Wireless OFDM Systems," IEEE Communications Surveys & Tutorials, vol. 2, no. 2, $2^{nd}$ Quarter 2007 pp: 18-48.

The invention claimed is:

1. A method, comprising:
in an OFDM system wherein digital transmitted symbols modulating OFDM sub-carriers are received via at least one receiving antenna j as a signal vector $Y_j$ received over at least one transmission channel represented by a frequency domain channel estimate vector $\hat{H}_j$, at a sequence of time instants wherein a current time instant k lies between a previous time instant k−1 and a next time instant k+1;
a) determining said frequency domain channel estimate vector $\hat{H}_{j,k-1}$ at said previous time instant k−1 as well as said received signal vector $Y_{j,k}$ at said current time instant k;
b) producing an estimate $\hat{A}_k$ of the digital transmitted symbols at said current time instant k based on said frequency domain channel estimate vector $\hat{H}_{j,k-1}$ and said received signal vector $Y_{j,k}$ at said current time instant k, each symbol in the estimate $\hat{A}_k$ having a reliability factor;
c) computing an updated version of said frequency domain channel estimate vector $\hat{H}_{j,k}$ at said current time instant k based on said received signal vector $Y_{j,k}$ at said current time instant k using said estimate $\hat{A}_k$ as a set of known digital transmitted symbols based on selecting a threshold number of symbols from estimate $\hat{A}_k$ that include a combination of symbols having a reliability factor that exceeds a threshold reliability and if the threshold number is not reached then supplementing the selection with a balance of symbols having a reliability factor below the reliability threshold;
d) using said updated version of said frequency domain channel estimate vector $\hat{H}_{j,k}$ at said current time instant k for equalizing said at least one transmission channel, in decoding said received signal vector $Y_{j,k}$ at said current time instant k, and
e) storing said updated version of said frequency domain channel estimate vector $\hat{H}_{j,k}$ at said current time instant k for use in steps a) and b) at said next time instant k+1.

2. The method of claim 1, including, in performing said step b):
attributing respective reliability coefficients to the estimated data symbols in said received signal vector $Y_{j,k}$, and
selecting, in producing said estimate $\hat{A}_k$ of the digital transmitted symbols, those symbols having an attributed reliability coefficient higher than or equal to a given reliability threshold $\psi_{thr}$.

3. The method of claim 1, including extending said estimate $\hat{A}_k$ of the digital transmitted symbols at said current time instant k by supplementing it with known pilot symbols.

4. The method of claim 1, including producing said estimate $\hat{A}_k$ of the digital transmitted symbols at said current time instant k by means of a hard decision on said received signal vector $Y_j$.

5. The method of claim 2, including attributing said respective reliability coefficients as a function of the square amplitude of said received data symbols.

6. The method of claim 2, wherein said digital transmitted symbols modulating OFDM sub-carriers are received via a plurality of receiving antennas J=1 ..., R, including attributing said respective reliability coefficients as a function of one of:
the sum of the square amplitudes of said received data symbols over said plurality of receiving antennas,
the maximum of the square amplitude of said received data symbols over said plurality of receiving antennas.

7. A method of channel estimation in OFDM transmission systems wherein digital transmitted symbols modulating OFDM sub-carriers are received via at least one receiving antenna j as a signal vector $Y_j$ received over at least one transmission channel represented by a frequency domain channel estimate vector $\hat{H}_j$, the method including, at a sequence of time instants wherein a current time instant k lies between a previous time instant k−1 and a next time instant k+1:
a) determining said frequency domain channel estimate vector $\hat{H}_{j,k-1}$ at said previous time instant k−1 as well as said received signal vector $Y_{j,k}$ at said current time instant k;
b) producing an estimate $\hat{A}_k$ of the digital transmitted symbols at said current time instant k based on said frequency domain channel estimate vector $\hat{H}_{j,k-1}$ and said received signal vector $Y_{j,k}$ at said current time instant k;
c) computing an updated version of said frequency domain channel estimate vector $\hat{H}_{j,k}$ at said current time instant k based on said received signal vector $Y_{j,k}$ at said current time instant k using said estimate $\hat{A}_k$ as a set of known digital transmitted symbols;
d) using said updated version of said frequency domain channel estimate vector $\hat{H}_{j,k}$ at said current time instant k for equalizing said at least one transmission channel, in decoding said received signal vector $Y_{j,k}$ at said current time instant k, and
e) storing said updated version of said frequency domain channel estimate vector $\hat{H}_{j,k}$ at said current time instant k for use in steps a) and b) at said next time instant k+1;
wherein in performing said step b):
attributing respective reliability coefficients to the estimated data symbols in said received signal vector $Y_{j,k}$, and
selecting, in producing said estimate $\hat{A}_k$ of the digital transmitted symbols, those symbols having an attributed reliability coefficient higher than or equal to a given reliability threshold $\psi_{thr}$; and
further including:
checking if the number of symbols for producing said estimate $\hat{A}_k$ of the digital transmitted symbols is at least equal to a given value $L_{ch}$, and
if said checking yields a negative outcome, supplementing the symbols for producing said estimate $\hat{A}_k$ of the digital transmitted symbols with further symbols having an attributed reliability coefficient lower than said reliability threshold $\psi_{thr}$ to reach said given value $L_{ch}$, said further symbols being selected preferably by giving preference to the symbols having higher reliability coefficients.

* * * * *